March 22, 1955   E. B. HAMMOND, JR., ET AL   2,704,489
SERVO SYSTEM FOR AIRCRAFT TURRETS
Filed April 17, 1943   3 Sheets-Sheet 1

INVENTORS
E. B. HAMMOND, JR.
W. G. WING
BY F. N. WILLIAMS, JR.
THEIR ATTORNEY

March 22, 1955  E. B. HAMMOND, JR., ET AL  2,704,489
SERVO SYSTEM FOR AIRCRAFT TURRETS
Filed April 17, 1943  3 Sheets-Sheet 2

FIG. 4

INVENTORS
E. B. HAMMOND, JR.
W. G. WING
F. N. WILLIAMS, JR.
BY Herbert W. Thompson
THEIR ATTORNEY March 22, 1955  E. B. HAMMOND, JR., ET AL  2,704,489
SERVO SYSTEM FOR AIRCRAFT TURRETS
Filed April 17, 1943  3 Sheets-Sheet 3

INVENTORS
E. B. HAMMOND, JR.
W. G. WING
F. N. WILLIAMS, JR.
BY
THEIR ATTORNEY

United States Patent Office 2,704,489
Patented Mar. 22, 1955

2,704,489

SERVO SYSTEM FOR AIRCRAFT TURRETS

Edmund B. Hammond, Jr., Brooklyn, Willis G. Wing, West Hempstead, and F. Norton Williams, Jr., Forest Hills, N. Y., assignors to The Sperry Corporation, a corporation of Delaware Application April 17, 1943, Serial No. 483,532

24 Claims. (Cl. 89—41)

This invention relates to a servo system which is particularly designed and adapted for use in the operation and stabilization of aircraft turrets, and the system, herein disclosed, may be employed either in the control of the turret in azimuthal or elevation motion or in like movement of the guns thereof.

The system of the present invention is essentially a rate lag system, that is to say, the turret will lag the controlling or reference member such, for example, as a rate gyro at a substantially constant angle for uniform rates of the reference member. In systems of this character, it is extremely desirable that this lag be maintained as small as possible while, at the same time, maintaining the system stable.

In practice, various types of controllers may be employed in forming the stabilizing or positioning servo system of our invention. Hence, it will be understood that we refer to a turret as an example of an element positionable or stabilized thereby and to a rate gyro as one form of controller for providing a position reference. However, the combination of elements herein described is particularly useful in aircraft turret positioning or stabilization because of its stability with extremely accurate follow-up performance.

It is an object of the present invention to provide a system which will maintain close tracking of the turret behind the reference member or rate gyro while providing a completely stable system. In other words, it is the primary object of this invention to provide a servo system of the rate lag type in which the lag is maintained within allowable limits or within a small fraction of a degree without rendering the system unstable or "jittery."

Another object of our invention resides in providing a system having the foregoing characteristics which comprises a signal amplifying circuit including a means for deriving a time derivative of the input signal for damping the system and a gain controlling means for providing high gain for signals of low frequencies but low gain for signals of comparatively high frequencies.

It is another object to provide a servo system including signal amplifying means of the foregoing character which further includes demodulator and filter means for providing an amplified direct current signal for controlling purposes.

Where the servo systems are used to control and position a gun turret in azimuth and also the guns thereof in elevation, separate or the same controller or gyro may be used to control both of the servomotors. The controller serves not only to control the displacement or angle through which the turret or guns are moved by the servomotors, but it also provides a rate reference and thereby controls the rate of operation of the servo systems. Where a gyro, for example, is used to control both the azimuth servomotor for turning the turret in azimuth and the elevation servomotor for raising or lowering the guns in elevation, the gyro is caused to precess about its horizontal or azimuth axis to provide a rate reference in the elevation control of the guns. Under these conditions, the spin axis of the gyro will be maintained substantially in the plane of elevation or slant plane of the guns. Therefore, assuming that the gyro spin axis lies in a slant plane at an angle to a horizontal plane or a reference plane in which the turret is turned in azimuth and the gyro is caused to precess about the axis thereof perpendicular to said slant plane at a given rate and through a given angular displacement, both the rate and the displacement of the gyro measured in the slant plane will differ in magnitude from the corresponding, projected rate and displacement values in the horizontal plane. In other words, the servomotor and control are ordinarily so designed that the servo will provide maximum rate of operation when a maximum reference rate is established in the plane of operation of the servo or movement of the member operated thereby. Therefore, if the rate established by the gyro takes place in a slant plane, the servomotor will be unable to operate at a rate sufficiently high to provide a close follow-up of the rate reference member.

It is, therefore, a further object of our invention to provide a control system for a servomotor in which the control member establishes a rate reference in some plane other than the plane in which the servomotor operates to position the turret, said system comprising means for limting the maximum rate reference which may be established by the reference member depending upon the angle between the plane in which the reference member moves and the reference plane or plane in which the turret is positioned by the servo.

A still further object of our invention resides in providing a control system of the foregoing character in which the limiting means is so controlled that the maximum rate which may be established by the reference member is a function of the cosine of the angle which the plane in which said reference is established makes with the reference plane or plane of azimuthal movement of the turret.

A still further object resides in providing a control system for the elevation servomotor of a gun turret which is operable to provide a variable range of operation of the servomotor in positioning the guns in elevation, said range being variable with azimuthal movement of the turret.

Still another object resides in providing in a servomotor control system means whereby the gyro or other control device may be by-passed and the servo systems controlled directly by a manual control means.

With the foregoing and still other objects in view, our invention includes the novel construction, correlations and arrangement of elements described below and illustrated in the accompanying drawings, in which—

Figures 1, 3:
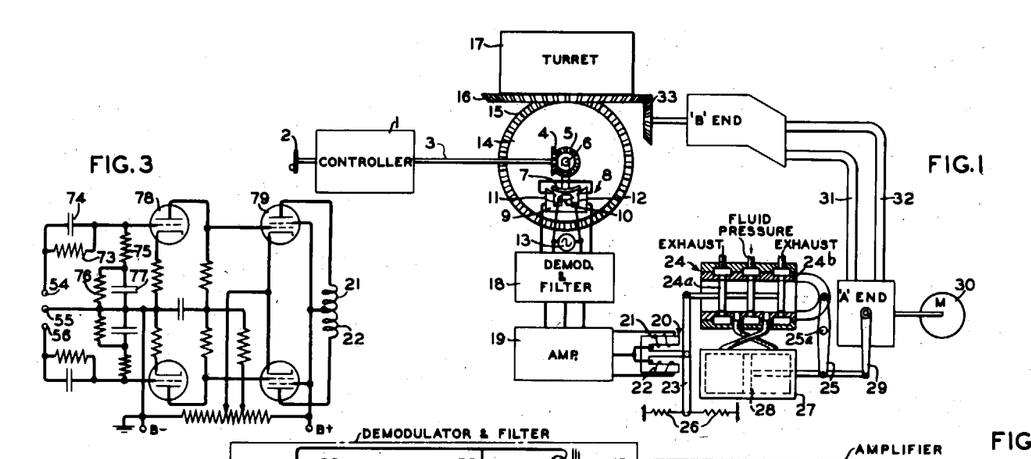
Fig. 1 is a somewhat schematic representation of the present invention.
Fig. 3 is a wiring diagram of a modified portion of the signal amplifier circuit.

Referring first to Fig. 1, wherein we have shown the preferred arrangement of parts of a servo system for aircraft turrets, 1 represents generally a controller as, for example, a rate gyro which is the preferred embodiment of a reference member for controlling the turret or the guns thereof either in azimuth or in elevation. It will be understood that by means of the lever or handwheel 2, the rate gyro may be caused to precess at a predetermined rate and the movement thereof is imparted, in the embodiment herein shown which is purely illustrative, through shaft 3 and bevel gears 4 and 5 to shaft 6 on which is mounted the armature 7 of a suitable pickoff device represented generally at 8. The pick-off in this case constitutes an alternating current signal generator and includes the core 9, on the central leg of which is wound an exciting winding 10 and on the outer legs of which are wound pick-off windings 11 and 12, respectively. The exciting winding 10 is connected to a suitable alternating current source 13 and functions to provide a flux which flows from the central leg through the armature and back through the outer legs of the core, the relative distribution thereof in the two magnetic paths being dependent upon the relationship of the armature with respect to the outer legs of the core.

For illustration purposes, we have shown the core 9 as mounted upon a rotatable element 14 having its axis of rotation coincident with the axis of shaft 6 and including the bevel gear 15 which is adapted to mesh with bevel gear 16 movable with the turret 17.

Assuming that the core 9 is stationary and that the rate gyro is controlled to precess at a predetermined rate, armature 7 of the signal generator will rotate relative to the core 9 and thereby supply a signal to the demodulator and amplifier units 18 and 19, respectively, which will be of a magnitude proportional to the displacement of the armature 7 relative to the core and of a phase sense depending upon the direction of rotation of the armature 7.

As hereinafter more fully explained, the alternating current signal is demodulated, filtered and the resulting direct current signal differentiated and amplified and supplied to the torque motor indicated generally at 20. The direct current signal output of the amplifying circuit will be impressed across the windings 21 and 22 of the torque motor, and the torque exerted thereby and its direction will depend upon the magnitude and phase sense of the alternating current signal.

The armature 23 of the torque motor is connected to the piston 24a of a control valve 24, and the armature 23 is normally biased to a neutral or valve cut-off position by the centering springs 26. The control valve 24 controls the flow of fluid under pressure to and the exhaust of fluid from the cylinder 27 of a stroking piston 28 which in turn is connected to lever 29 which controls the "A" end of a Vickers system. In the embodiment illustrated, the sleeve 24b of control valve 24 is connected through lever 25, pivoted at 25a, to the rod of stroking piston 28 to provide rate control.

The Vickers system comprises what is known as an "A" end and a "B" end, the "B" end constituting a hydraulic motor and being connected to the load while the "A" end controls the rate or speed of the "B" end output. In other words, the "A" end constitutes a hydraulic pump which is driven by motor 30 and the displacement thereof is controlled by lever 29 whereby both the speed of the "B" end and its direction of operation is controlled, fluid being circulated between both ends through the conduits 31 and 32. The load, in the present disclosure, consists of the turret 17 which is driven from the "B" end through the gear 16 and gear 33 which meshes therewith and is mounted on the output shaft of the "B" end of the Vickers unit. In like manner, the "B" end may be connected to position the guns of the turret in elevation and to track the reference provided by a rate gyro arranged for gun elevation control purposes.

The operation of the foregoing system, briefly, is as follows. The signal derived from the signal generator 8 serves to control the position of the piston of the control valve 24 which, depending upon the direction in which the torque motor is actuated by the signal and the magnitude of the signal, controls the direction and rate of operation of the output of the Vickers system.

Figure 2:
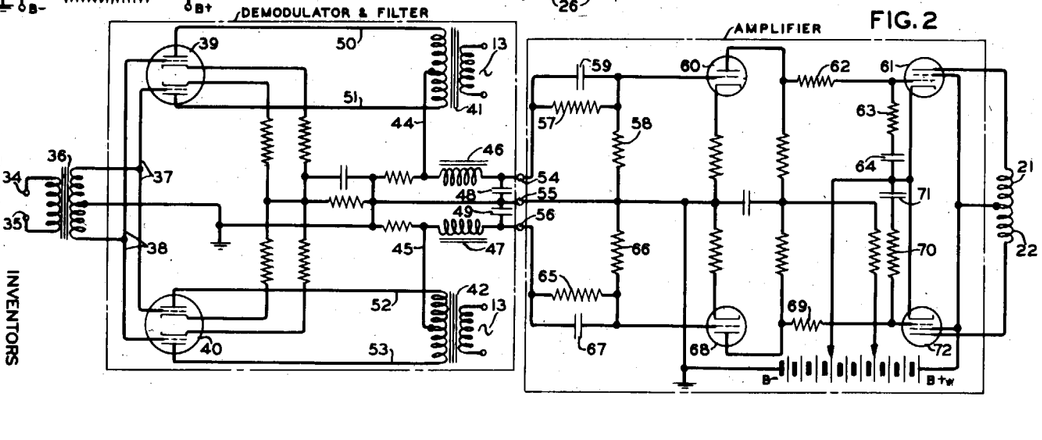
Fig. 2 is a wiring diagram of the preferred form of signal amplifying circuit.

In accordance with our invention and as disclosed in Fig. 2, the alternating signal output from the signal generator 8 is impressed across the terminals 34 and 35 of the primary of an input transformer 36 of the demodulator and filter portion of the amplifier circuit. The center-tap of the secondary of transformer 36 is connected to ground, as illustrated, and the outer terminals of the secondary are each connected, respectively, through conductors 37 and 38, to the grids of one set of tube elements respectively, in each of two twin triode tubes 39 and 40. A reference voltage is supplied to the plate elements of these tubes through transformers 41 and 42, respectively, the primaries thereof being connected preferably to the source 13 of alternating current which is employed in energizing the signal generator 8. The center-taps of the secondaries of transformers 41 and 42 are connected through conductors 44 and 45, respectively, to filter circuits including the chokes 46 and 47 and the smoothing condensers 48 and 49. The condensers 48 and 49 are, of course, connected between the output legs of the chokes 46 and 49 and ground as illustrated.

The outer terminals of the secondaries of transformer 41 are connected through conductors 50 and 51 to the two plate elements, respectively, of the tube 39 while opposite ends of the secondary of transformer 42 are connected through conductors 52 and 53 to the two plate elements, respectively, of tube 40. It will be understood that the voltage supplied from the secondaries of transformers 41 and 42 will be substantially 180° out of phase. Hence, for a signal having one phase sense, the direct current voltage signal appearing across the output taps 54 and 55 will be of predominating magnitude while for an alternating current signal of the opposite phase sense a predominating direct current voltage signal will appear across the output taps 56 and 55 of the demodulator and filter circuits. With the arrangement shown, full wave demodulation occurs in both branches of the demodulator circuit since tubes 39 and 40 will either conduct between one or the other sets of tube elements therein on each half wave.

Further in accordance with our invention, the output taps of the demodulator and filter circuit are connected as shown to a direct current signal amplifying circuit. The tap 55 constitutes a grounded connection between parallel branches of the entire amplifier circuit. Tap 54 is connected to a resistance and capacitance, differentiating circuit herein disclosed as including the resistors 57 and 58 and condenser 59. The function of this circuit is to derive from the input signal voltage supplied thereto across the taps 54 and 55 a voltage component which is substantially proportional to the time rate of change of such input voltage. In other words, this differentiating circuit provides a signal which is a time derivative signal substantially proportional to the rate of change of the error angle between the gyro and the turret. Both the original signal and its derivative are then supplied to the grid of a first amplifier tube 60. The output of the first stage of amplification is then connected through a gain control circuit to the grid of a second amplifier tube 61.

The gain control circuit in the embodiment thereof illustrated in Fig. 2 comprises resistors 62 and 63 and condenser 64. Since the voltage across the condenser 64 cannot fluctuate rapidly, this circuit will provide a gain control such that the gain is an inverse function of the frequency of the input voltage. In other words, if a direct current voltage were supplied to this circuit or a voltage changing at a relatively low frequency, the gain provided through this circuit would be relatively high. Whereas, if the input voltage experienced a change of relatively high frequency characteristic, an extremely small gain of the amplifier would occur.

The plate of tube 61 is connected to one of the windings 21 of torque motor 20. The other parallel branch circuit of the amplifying portion of the circuit above described is similar in all respects to that above set forth. In other words, the signal across the taps 55 and 56 is supplied to a differentiating circuit comprising the resistors 65 and 66 and condenser 67 which, in turn, supplies the original signal and a time derivative thereof to the grid of amplifier tube 68. The output of this tube is supplied to a gain control circuit including the resistors 69 and 70 and condenser 71. Finally, the output of this circuit is connected to the grid of a second amplifier tube 72, the plate of which is connected to the other winding 22 of the torque motor 20.

An amplifying circuit of the foregoing character has proven to be particularly adapted for use in the control of an aircraft turret servo system of the character hereinbefore described. The differentiating circuit functions to dampen the operation of the servo system and thereby prevent undesirable oscillations while the gain control circuit serves to provide an extremely small steady state rate lag between the turret and the reference member or the rate gyro, within a small fraction of a degree for full gyro rate, but without instability. The circuit will provide high gain for signal changes of relatively low frequency while providing low gain of the circuit when signal changes of a relatively high frequency nature occur.

In the embodiment of the amplifying portion of our signal amplifying circuit shown in Fig. 3, we have shown the differentiating circuit and the gain control circuits connected together and before the first stage of amplification is reached, and in Fig. 3 we have shown two stages of amplification merely for exemplary purposes. The input connectors to the circuit of Fig. 3 are adapted to be connected across the output taps 54, 55 and 56 of the demodulator and filter circuit. The differentiating circuit includes the resistor 73 and condenser 74 and the gain control circuit includes resistors 75 and 76 and condenser 77. Since the two parallel branches of this circuit are substantially identical, the description of one branch is deemed to be sufficient for explanatory purposes. The voltage output from the differentiating and gain control circuits is supplied to the grid of tube 78 or the first stage of amplification and the plate of this tube is resistance coupled to the grid of a second amplifying tube 79, the plates of the amplifier tube 79 in both branches of the circuit being connected to the windings 21 and 22, respectively, of the torque motor 20.

Circuits including demodulator and filter circuits of the character herein set forth coupled to amplifier circuits of the character shown in Fig. 2 or 3 will provide controls over the servo system which are substantially identical. With an arrangement of circuit elements such as shown in Fig. 3, a single stage of amplification may be employed.

It will be understood that where we have made reference to a direct current signal that this term is used in its broad sense and as descriptive of a signal of a unidirectional current character.

In the foregoing, we have described a preferred form of servo system which may be used either in positioning the gun turret in azimuth or the guns thereof in elevation, and the control 1 may provide a rate reference, in its control over the rate of operation of the associated servomotor, which reference is established in the plane in which the turret or guns are positioned, respectively. On the other hand, a single controller may be used to control both the azimuth and elevation servomotors. In the latter case, assuming a gyro is employed as the controller, a rate reference is established in a vertical plane to control the elevation servo while a rate reference in the slant plane of the guns, assuming the spin axis of the gyro parallels the guns, is established to control the azimuth servo. Hence, it is desirable to employ a control system, which is associated with the controller or gyro, of the character disclosed in Fig. 4 wherein a means is provided to limit the maximum torque applied to effect precession of the gyro in control of the azimuth servomotor. The reason for the inclusion of a control of this character should be apparent from a consideration of Fig. 5.

Figure 5:
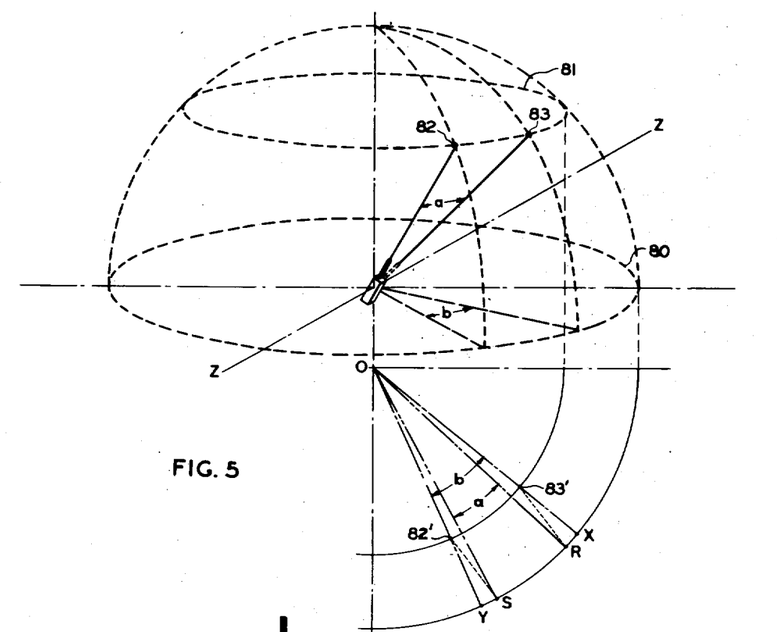
Fig. 5 represents, in perspective, the relationship of a displacement angle in a slant plane and a corresponding, projected angle in a horizontal plane, and the relative magnitudes of these angles in a common plane.
Figure 6:
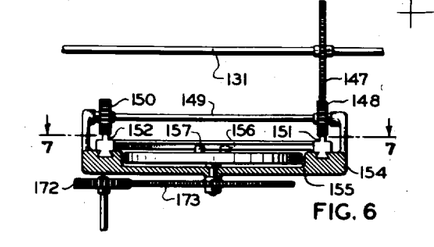
Fig. 6 is an elevation view, partially in section, of one form of device for limiting the maximum torque which may be applied to the gyro.

The maximum rate of operation of the azimuth servomotor and the maximum reference rate which may be established by the gyro or the reference member are so correlated that the servomotor may operate the turret in azimuth closely to follow the movement of the reference member and with an extremely small lag at maximum speed. When the rate reference is established in the plane of or a plane parallel to that in which the turret is so positioned, the turret will be angularly displaced through the same angle as that through which the reference member is precessed and substantially at the same rate. However, when the axis about which the reference member is precessed in establishing an azimuth rate reference is tilted with respect to the horizontal plane or plane of movement of the turret in accordance with elevation of the guns above or below a horizontal plane, the plane of movement of the reference member will coincide with the slant plane of the guns. In Fig. 5, we have assumed that the gyro has been precessed to provide a rate reference in its control over the azimuth servo through the angle $a$ and that this angle lies in the slant plane of the guns as indicated. The turret, however, it is assumed, is moved in azimuth in a horizontal plane such as the plane 80. The projection of angle $a$ in horizontal plane 80 will form the angle $b$, but the angle $a$ measured in the slant plane will be appreciably smaller than the angle $b$. To illustrate the relative magnitudes of these angles, we have projected the angle $b$ into the plane of the paper to form the angle XOY, which will be the true magnitude of angle $b$ shown perspectively in the hemisphere. Likewise, to reproduce the angle $a$ measured in the slant plane in the same plane with angle XOY for comparative purposes, we have obtained the projection of the angle $a$ as measured by arc 82—83 in the plane 81 or in the plane of the paper as indicated by the angle 82'—O—83' and then rotated the angle $a$ by projecting the points 82 and 83 parallel to the bisector of angle $a$ or about axis Z—Z until they coincide with the arc in the plane of the paper which is the projection of the intersection of plane 80 with the sphere. Therefore, the true measure of angle $a$ will be the angle ROS.

From this illustration, it will be quite apparent that if the gyro is precessed at a maximum rate, which if occurring in the plane 80 would provide a maximum rate of operation of the azimuth servomotor, but is established in the slant plane to provide angular displacement through the angle $a$, the servomotor, in order to track closely, must turn the turret through angle $b$, which is appreciably larger than angle $a$, in the same time interval as that established by the rate reference. Therefore, the servo will be unable to function at the rate called for by the gyro since the gyro rate will exceed maximum servo rate.

The relationship in the magnitudes of angles $a$ and $b$ is approximately a function of the cosine of the angle between the slant plane and the horizontal or plane 80. Therefore, to permit the establishment of reference rates at all times but rates which will not exceed the maximum rate of operation of the azimuth servomotor, it is our purpose variably to limit the maximum rate which may be established by the gyro. In other words, if the reference member of the gyro is caused to precess and thereby establish a rate in the horizontal plane, no limitation will be effected thereon, but if the angle between the plane in which the reference member moves and the horizontal increases a proportionately greater limitation will be placed on the maximum rate at which the gyro may be caused to precess, whereby the rate established by the gyro for movements thereof in any slant plane will be automatically restricted to a value which the servomotor is capable of attaining.

Figure 4:
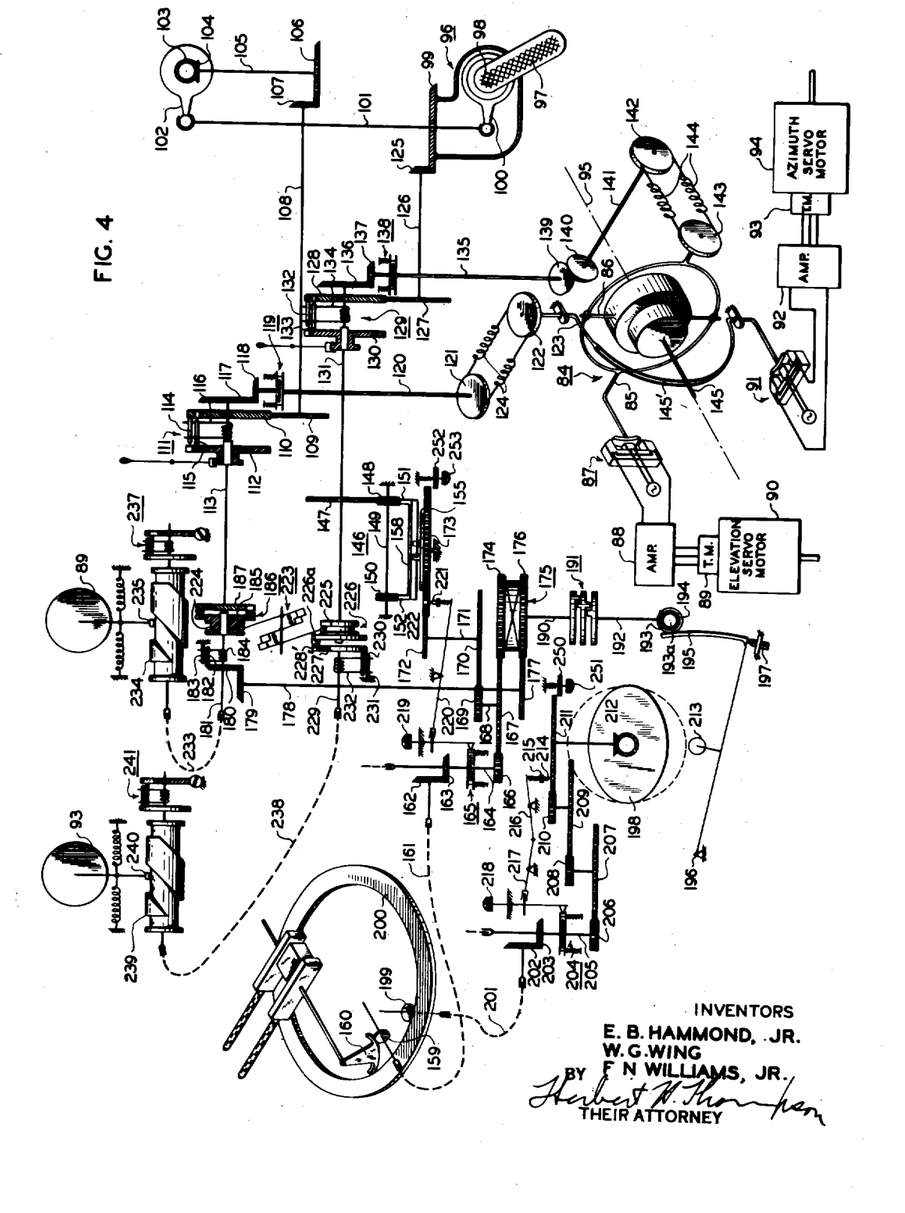
Fig. 4 schematically represents a preferred form of control system for the azimuth and elevation servomotors of a gun turret.

Referring to Fig. 4, we have shown a gyro, indicated generally at 84, which is supported to precess about the axes 85 and 86. If a torque is applied about the axis 86, the rotor bearing case will precess about the axis 85 thereby providing a signal output, as hereinbefore described, from the signal generator or pick-off 87, which is supplied through the amplifier 88, which may be of the character hereinbefore described. The output of the amplifier is supplied to the torque motor 89 which controls the operation of the elevation servomotor 90, connected to control the elevation movements of the guns. Likewise, if torque is applied about the axis 85 of the gyro, the rotor bearing case will precess about the axis 86, thereby providing a signal output from the signal generator 91 which is supplied to amplifier 92 and thence to torque motor 93, which in turn controls the azimuth servomotor for positioning the turret in azimuth.

For descriptive purposes, it will be assumed that the turret is rotated by the azimuth servo in a horizontal plane and the spin axis 95 of the gyro will lie parallel with the axis of the gun. The gyro spin axis could parallel the gun sight in which event the control system would be correspondingly designed. In fact, the gyro is preferably mounted directly on the gun or dummy gun.

The manual control for both the elevation and azimuth servomotors is indicated generally at 96 and comprises the handles 97 (one only thereof being illustrated) which the gunner may grasp and rotate about axis 98 to control the elevation servo and which may be rotated about the axis of gear 99 in controlling the azimuth servo. In controlling the elevation servo, rotary movement of handle 97 about axis 98 is transmitted through lever 100 and link 101 to a second lever 102. Lever 102 will impart rotary movement to bevel gear 103 and through gear 104, meshing therewith to shaft 105. A bevel gear 106 is secured to shaft 105 and meshes with gear 107, which in turn is secured to shaft 108. A gear 109, mounted on shaft 108, meshes with gear 110, forming one element of a coupling indicated generally at 111. A second element of coupling 111, comprising disc 112, is splined to shaft 113. Normally, rotation of gear 110 is imparted to disc 112 through the medium of pins 114 and 115 which are normally held against relative movement by a torsion spring 116. Gear 110 is mounted freely to rotate on shaft 113, and shaft 113 through bevel gears 117 and 118 and friction coupling 119 is adapted to drive shaft 120. Shaft 120 is connected to one pulley 121 of a torque device, the other pulley 122 being secured to the yoke 123 of gyro 84 and the two pulleys being connected together by springs 124.

From the foregoing it should be apparent that when the manual control 96 is rotated about the axis 98, a torque will be applied to the gyro about the axis 86 thereof, the magnitude of said torque and the direction thereof being dependent upon the magnitude and direction of rotation of the manual control 96. Furthermore, the magnitude of the torque applied to the gyro will determine the rate at which it will precess about the axis 85 thereof and its rate of precession will be reflected in the signal output of the signal generator 87 in such a manner that the elevation servo will operate at the rate established by the yoke 123 or reference member of the gyro. It will be understood that the armature of generator 87 will move with the gyro as it precesses about the axis 85 and that the core of the generator will move relative thereto in timed relation with elevation movement of the guns.

In controlling the azimuth servomotor, the manual control 96 is rotated about the axis of gear 99 and this movement is transmitted through gear 125, meshing with gear 99, and shaft 126 to gear 127, which meshes with gear 128, constituting one element of a coupling 129, generally similar in all respects to coupling 111. The other element of this coupling comprises a disc 130 splined to shaft 131, on which gear 128 is freely rotatable, and normally gear 128 and disc 140 are caused to rotate together through the medium of pins 132, 133, and torsion spring 134 in the manner above described. When shaft 131 is rotated, this movement will be imparted to shaft 135 by means of bevel gears 136 and 137 and friction coupling 138. Shaft 135 through bevel gears 139 and 140, drives shaft 141, on which is mounted one pulley 142 of a torque device similar to that above described. The other pulley 143 of the torque device is mounted on the axis 85 of the gyro and connected to pulley 142 through springs 144.

When the manual control 96 is rotated about the axis of gear 99, a torque will be applied through the transmission above described about the axis 85 of the gyro, thereby causing it to precess about its axis 86 in a direction and at a rate depending upon the direction and the magnitude of rotation of the manual control 96 about the axis of gear 99. Precession of the gyro about the axis 86 will cause the signal generator 91 to function substantially in the same manner as above described in connection with signal generator 87, the core thereof being movable relative to the armature in timed relation with azimuthal movements of the turret.

If the elevation servomotor is so operated as to position the guns at an angle to the horizontal, the spin axis 95 of the gyro will also lie at the same angle to the horizontal, the shaft 145 on the rotor bearing case passing through the slot 145' in yoke 123 thereby permitting rotation of the gyro about axis 85 while movement thereof about the axis 86 will be imparted to the yoke 123. If the gyro is then caused to precess about its axis 86 while the spin axis thereof lies in the slant plane of the guns or in a plane angularly disposed to the horizontal, the rate reference established thereby will take place in the slant plane and, in accordance with our invention, means indicated generally at 146 are provided to limit the maximum rate reference which may be established by the gyro depending upon the angular relationship of its spin axis to the horizontal.

In the embodiment illustrated, gear 147 is mounted on shaft 131 and meshes with gear 148 secured to shaft 149. A second gear 150 is mounted on shaft 149 and both gears 148 and 150 mesh with racks 151 and 152, respectively, formed on an H-shaped frame 153, which is more clearly illustrated in Fig. 7. Frame 153 is guided for linear movement on a base 154 and will move back and forth depending upon the direction and degree of rotation of gear 147 and shaft 131. Hence, when the manual control is moved about the axis of gear 99, the H-shaped frame 153 will move linearly in one direction or the other and to an extent dependent upon the direction and degree of movement of the manual control.

Figure 7:
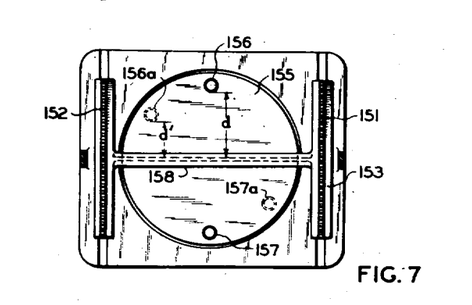
Fig. 7 is a fragmentary plane view thereof taken in about the plane 7—7 of Fig. 6.

Also associated with the base 154 and rotatably supported thereon is a disc 155 on which are mounted diametrically opposed pins 156 and 157. These pins up-stand from the disc 155 and lie on opposite sides of the transverse bar 158 of the H-shaped frame 153. These pins up-stand sufficiently to be engaged by the bar 158 if the H-shaped frame is moved a sufficient distance.

The disc 155 is rotated in timed relation with elevation movements of the guns. In Fig. 4, this connection is schematically indicated as including a gear 159 meshing with a sector gear 160, which in turn rotates with elevation movement of the guns. Gear 159 through suitable flexible connection 161 drives gear 162. Gear 162 through gear 163 will in turn drive shaft 164 through friction coupling 165. Shaft 164 has mounted thereon gear 166 meshing with gear 167. Gear 167 is mounted on shaft 168 and through gear 169 drives gear 170. Gear 170 is mounted on shaft 171 on which is mounted gear 172 and gear 172 through gear 173 serves to rotate the disc 155.

The transmission between sector 160 on the axis about which the guns rotate in elevation and disc 155 is so arranged that when the guns are horizontal the pins 156 and 157 occupy the positions shown in full lines in Fig. 7 relative to the bar 158. Under these conditions, the bar 158 may be displaced from its central position to either side thereof through the distance $d$ which is sufficient to permit shaft 131 to rotate and impart full torque to the gyro 84. However, if the guns are moved in elevation above or below the horizontal plane, disc 155 will be rotated, thereby rotating the pins inwardly toward the bar 158, for example, to the position indicated on dotted lines at 156a and 157a. Under these conditions, the bar 158 may be displaced from the central position to either side thereof through a smaller distance indicated at $d'$. Movement of the bar 158 will be arrested by either the pin 156a or 157a, assuming that the manual control is moved to apply full torque to the gyro. When this occurs, shaft 131 through gears 147 and 148 will be prevented from further rotation and will therefore prevent full torque from being applied to the gyro, limiting the torque to a value proportional to the distance through which the bar 158 can move. Since the movement of the bar 158 is linear and movement of the pins 156 and 157 is rotary, the stroke of bar 158 permitted by said pins will vary aproximately with the cosine of the angle which the guns make to the horizontal assuming the disc 155 moves through the same angular distance as the guns do. Therefore, the maximum torque which may be applied to the gyro and the maximum rate reference which it may establish will be an approximate function of the cosine of the angle between the slant plane of the guns and the horizontal or some reference plane.

It will be observed that, although the shaft 131 may be prevented from applying full torque to the gyro through the operation of the limiting device 146, the manual control may be moved by the gunner without any limitation thereon by virtue of the resilient connection between the elements 128 and 130 of the coupling 129. In other words, the gear 128 of the coupling may continue to rotate through the operation of the manual control while the disc 130 will remain stationary, relative rotation thereof being permitted by the torsion spring 134.

Figure 8:
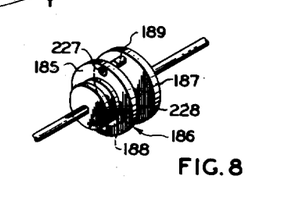
Fig. 8 is a perspective view of one of the couplings of our system.

Further in accordance with our invention, we provide means for limiting the displacement of the guns in elevation with respect to a horizontal reference plane and for variably limiting the displacement of the guns downwardly relative to the horizontal, the limitation in this latter respect varying with azimuthal movement of the turret and being dependent upon the design and contour of the aircraft on which the turret is mounted. The limitation on displacement of the guns above the horizontal is effected through the mechanism described in the following. Gear 159 meshing with sector 160 serves, as hereinabove described, to drive gear 167 through the medium of bevel gears 162 and 163, friction coupling 165 and gear 166. Gear 167, in addition to its function as a link in the drive of the limiting device 146, also meshes with gear 174, constituting one arm of a differential 175. Gear 176, constituting a second arm of the differential 175, meshes with gear 177, which is secured to shaft 178. Bevel gear 179 mounted on shaft 178 meshes with bevel gear 180, secured to shaft 181. Gear 180 and shaft 181 are normally biased to a neutral position by means of pins 182 and 183 and torsion spring 184, the pin 183 being grounded or fixed in position. One element 185 of a coupling indicated generally at 186 is splined to shaft 181 while the other element 187 thereof is secured to shaft 113. This coupling is more clearly illustrated in Fig. 8. Each of the coupling elements is provided with a pin 188 and 189, respectively, which are normally angularly displaced relative to each other about the axis of the shafts 113 and 181.

The third arm of the differential 175 is connected through shaft 190 and washer pile 191 to shaft 192 on which is mounted bevel gear 193. Bevel gear 193 meshes with gear 193a fastened on a shaft with gear 194 which meshes with an arcuate rack 195. Rack 195 is pivoted at 196 and may engage an adjustable stop 197.

The foregoing described combination of elements for limiting the angle of displacement of the guns above the horizontal operates in the following manner. Assuming that the guns start from a horizontal position and move upwardly, this movement thereof will be imparted through the sector 160, gear 159, flexible coupling 161, gears 162 and 163, friction coupling 164 and gears 166 and 167 to gear 174 of the differential 175. Since rotation of gear 177, associated with the gear 176 of differential 175, is opposed by the torsion spring 184 associated with the pin of gear 180 and the fixed pin 183, gear 167 through the differential 175 will drive the third arm thereof connected with shaft 190. This is so because under the assumed conditions, there will be no load upon this shaft. The washer pile 191 comprises a plurality of discs having cooperable abutments thereon arranged to permit relative angular movement of the discs until the abutments engage one another. Depending upon the number of discs employed and the relative angular relationship of the engaging faces of the abutments thereon, shaft 190 may rotate relative to shaft 192. The washer pile therefore serves to permit a pre-designed degree of relative rotation of shafts 190 and 192. However, when the discs of the washer pile prevent further relative rotation therebetween, shafts 192 and 190 will be coupled together for one direction of rotation thereof and thereafter the differential will serve to rotate gear 194 which drives bevel gears 193 and 193a, gear 193a meshing with the rack 195. This operation may continue until the rack bar, engaging the stop 197, prevents further rotation of the shafts 190 and 192. When this occurs, the differential 175 will drive through the gear 177, shaft 178 and bevel gears 179 and 180 causing the element 185 of clutch 186 to rotate.

Figure 9:
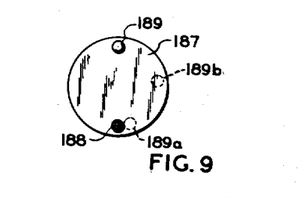
Fig. 9 is an elevation view of one of the elements of the coupling of Fig. 8.

As hereinabove explained, the pins 188 and 189 and the respective elements of clutch 186 are normally relatively angularly spaced about the axes of shafts 113 and 181. When the manual control 96 is operated to control the elevation movement of the guns, movement thereof is imparted through the gears and shafts herein described and through the coupling 111 through shaft 113, causing the pin 189 of element 187 to rotate, for example, in a clockwise direction as illustrated in Fig. 9. If the manual control is operated to apply full torque to the gyro 84, pin 189 will be moved to the dotted line position 189a illustrated in Fig. 9 and substantially into abutting relation with the pin 188 on the coupling element 185. When the differential 175 transfers its output drive to the gear 177, the element 185 of the coupling will be caused to rotate in a counter-clockwise direction and to an extent sufficient to move the pin from its position at 189a back to its original position 189. In other words, the shaft 113 will be rotated in a reverse direction sufficiently to remove any torque which may otherwise have been applied to the gyro 84 and thereby stop the elevation servo operation. This reversed movement of shaft 113 is permitted by coupling 111 since the two elements thereof are resiliently coupled together through the torsion spring 116.

In the foregoing description of the operation of our invention in limiting the displacement of the guns in elevation, it was assumed that a maximum rate torque had been applied to the gyro. Therefore, for example, if the device is designed to limit elevation movement of the guns to a displacement of 85° above the horizontal, the differential 175 will transfer its drive to gear 177 when the guns have been raised through a displacement of, for example, 80° and the remaining 5° will be traversed by the guns as they decelerate from a maximum rate to zero rate at 85° displacement. If, however, the guns are being elevated at some fraction of maximum rate, then the shaft 113 will have been rotated through an operation of the manual control through an angle sufficient to move the pin 189, for example, to the dotted line position 189b. Under these conditions, when the differential 175 rotates the pin 188 of the clutch 186, the pin must move in a counter-clockwise direction an angular distance depending upon the angular displacement of pin 189 before the shaft 113 is initially moved in a reverse direction to remove the torque from the gyro. Hence, it is obvious that with the arrangement of our invention above described that for operations of the elevation servomotor at less than maximum rates, deceleration thereof will start progressively nearer the 85° displacement limit as the constant rate approaches zero value.

In order to provide a variable limit for elevation movements of the guns below the horizontal plane, the value of which varies with azimuthal movement of the turret, we provide a cam 198 which is driven in timed relation with azimuthal movement of the turret. A gear 199 herein disclosed as meshing with the toothed azimuth ring 200 of the turret is connected through a flexible coupling 201 with bevel gear 202. Bevel gear 202 meshes with gear 203 and through the friction coupling 204 drives shaft 205 on which gear 206 is mounted. Gear 206, through the gear train comprising gears 207, 208, 209 and 210, drives gear 211, and gear 211, through the bevel gears 212, serves to rotate the cam 198.

As hereinbefore described, the displacement of the guns in elevation above the horizontal is controlled through the differential 175 and the pinion 193 and rack 195 engaging with as top 197. When the guns are moved in elevation downwardly below the horizontal, the operation of these elements is reversed so that the differential 175 will not transfer its drive to the gear 177 until relative movement of the shafts 190 and 192 is prevented by the washer pile 191 and the arcuate rack 195 has been moved in a direction, if such movement is permitted, as to engage an associated cam follower 213 with the cam 198. Obviously, the extent of movement of the rack 195 in one direction is limited by the stop 197 and in the other direction by the cam 198.

Maximum movement of said rack is permitted when the cam occupies the position illustrated, in which position we may assume that the guns are directly broadside. However, when the cam is rotated through 90° from the position herein illustrated, the cam follower 213 may move no farther than the distance therefrom to the circle shown in dash lines and representing the radius of the cam taken on the major axis thereof. With the cam in the latter assumed position, the guns may be assumed to lie along the fore and aft axis of the craft. In practice, the cam may be of quite irregular configuration and so designed as to allow the gunner to move the turret at maximum rate through as wide a range as possible while preventing the guns from being trained on any surface portion of the craft as they are rotated in azimuth, whereby any necessity of consideration by the gunner of the allowable limits to such movement as defined by the surface portions of the craft and the requirement to cease firing or decelerate and stop the turret as such limits are approached is eliminated. The cam causes the servomotors to aim the guns above the craft surfaces while allowing the gunner to aim them in close proximity thereto.

For initial adjustment of the control system of our invention the gear 211 may be provided with an opening 214 therein and a pin 215 may be resiliently urged into contact with the gear surface until it registers with said opening. The pin is operated by lever 216, in turn loosely coupled with a lever 217 which is coupled with the shaft of a button 218 which may be depressed by an operator to release the mating surfaces of the friction coupling 204. When the button 218 is depressed, the turret and gear 211 may be relatively moved. For example, gear 211 may be meshed with and rotated by gear 250, operated by knob 251, thereby causing the gear 211 and cam 212 to rotate until the pin 215 drops into the opening 214, whereupon the turret and the cam 198 will be correctly positioned relative to each other. The pin 215 having a fixed location relative to the craft will serve, when it engages opening 214 in gear 211, to locate the cam 212 in some known position relative to the craft. Therefore, the turret may be moved to a corresponding position and the cam and turret will be then arranged in correct positions relative to each other. When the button 218 is released, the plates of the coupling 204 will be resiliently urged together, thereby establishing a complete drive between the azimuth ring of the turret and the cam 198 and the pin 215 will be automatically withdrawn from engagement with the gear 211.

A similar initial adjustment of the rate-limiting device 146 may be effected through the button 219 which is adapted, when depressed, to separate the plates of the friction coupling 165 and, at the same time, through lever 220, which is operatively connected with the shaft thereof, resiliently to urge pin 221 into engagement with the surface of gear 173 or into the opening 222 in said gear when it lies in registry therewith. Hence, by depressing the button 219, gear 166 may be uncoupled from the drive through flexible connection 161 and relative rotation of the guns in elevation and the disc 155 effected by gear 252 when meshed with gear 173 and operated by knob 253 until the pin 221 drops into the opening 222 in gear 173. Thereafter, when the button 219 is released, the plates of the friction coupling 165 will engage each other and the pin 221 will be withdrawn from engagement with the gear 173.

If it is desired to control the several motors directly from the manual control 96 to the torque motors, the gyro 84 may be by-passed by providing a switch device indicated generally at 223. The respective arms of this switch engage within an annular channel 224 in the element 185 of coupling 186 and in an annular channel in one element 225 of a coupling 226 which is splined on shaft 131. For this purpose the respective elements 185 and 187 of the coupling 186 are provided with openings 227 and 228 (see Fig. 8) which are adapted to receive the pins 189 and 188 respectively and, when the switch 223 is operated in a clockwise direction as shown in Fig. 4, the element 185, being splined on shaft 181, may be moved positively to couple the shafts 113 and 181 together. Likewise, the coupling 226 comprises a second element 227' having an opening 228' therein which is adapted to receive a pin 226a with which the element 225 is provided. Operation of the switch 223 in the above-described manner will cause the pin of element 225 to pass within the opening 228' of the element 227' and thereby positively couple shaft 131 with shaft 229 on which the element 227' is mounted. Shaft 229 and the element 227' are normally biased to a neutral position by means of pins 230 and 231 which are biased together by the torsion spring 232, the pin 231 being grounded or fixed in position.

The shaft 181 is connected through a flexible coupling 233 to rotate a cam 234. Cam 234 is helical in form and so arranged that the projecting end 235 of the armature of torque motor 89 may be received between the helical cam surfaces thereof. Furthermore, a certain spacing between the helical cam surfaces and the follower 235 is necessary in order that the armature of the torque motor may move a distance corresponding to full servo rate without interference, and preferably such spacing is sufficient to permit the cam to rotate somewhat before the cam surfaces engage the armature of the torque motor when so moved from a central or neutral position. The cam 234 is normally biased to a neutral position by the torsion spring and associated elements indicated generally at 237.

Likewise the shaft 229 is connected through a flexible coupling 238 with cam 239, generally similar in all respects to cam 234, the cam surfaces of which are adapted to engage the projecting end 240 of the armature of torque motor 93. This cam is likewise biased to some neutral position by the torsion spring and associated elements indicated generally at 241.

When the switch 223 is operated in the manner above described the shafts 113 and 181 will be directly coupled together as will shafts 131 and 229. Hence, movement of the manual control about the axis 98 thereof will be imparted through shafts 113 and 181 to effect rotation of cam 234 and thereby directly apply a torque to the armature of the torque motor 89 which controls the elevation servomotor. Similarly, rotation of the manual control about the axis of the gear 99 will be imparted through shaft 131 and 229 to effect rotation of cam 239, whereby a torque is applied directly to the armature of torque motor 93 to control the operation of the azimuth servomotor.

In connection with the coupling 186, it will be observed that if the switch 223 lies in the position illustrated, that is, with the two elements of the clutch in spaced relation that should the device for limiting upward displacement of the guns above a horizontal plane fail for some reason or other to remove the torque from the gyro, rotation of the gear 177 by the differential 175 will not only rotate the clutch element 185 in a direction tending to remove such torque but it will also rotate the cam 234 and thereby operate directly on the armature of the torque motor to terminate the operation of the elevation servomotor. For this reason, alone, it is desirable to so arrange the cam surfaces relative to the follower or end of the armature of the torque motor engaged thereby that the cam may rotate to some degree before engaging the cam follower or end of the armature and thereby provide a sufficient but small interval of time within which the torque may otherwise be removed from the gyro in accordance with the designed operation of the system.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a control for a servo system operable to position a member in a reference plane, servo means connected to drive said member, means including a reference means movable about an axis tiltable relative to said reference plane and operable to provide a rate reference for controlling the rate of operation of said servo means, means for establishing a rate of movement of said reference means, and variable means for limiting the maximum rate of movement established by said reference means, the degree of limitation effected thereby being variable with the angular relationship of said plane and axis.

2. In a control for a servo system operable to position a member in a reference plane, servo means connected to drive said member, means including a gyro having one of its supporting axes tiltable relative to said reference plane for controlling the rate of operation of said servo means, means for effecting precession of said gyro about said supporting axis at desired rates, and means for progressively limiting the maximum rate of precession of said gyro as the angle of said supporting axis relative to said reference plane decreases.

3. A servo system control for stabilized gun turrets comprising servo means for moving the turret in azimuth and the guns thereof in elevation, means movable in the plane of elevation of said guns to produce a rate reference for controlling the rate of operation of said servo means in azimuthal rotation of said turret, means for controlling the rate of said rate reference means, and means variable with elevation of said guns for progressively limiting the maximum rate of said rate reference means as the elevation angle increases with respect to the plane of azimuthal movement of said turret.

4. In a control for a servo system operable to position a member in a reference plane, servo means connected to drive said member, means including a reference means movable about an axis tiltable relative to said reference plane and operable to provide a rate reference for controlling the rate of operation of said servo means, means for establishing desired rates of movement of said reference means, and variable means comprising an element and means for moving said element in timed relation to tilting movement of said axis for limiting the maximum rate of movement of said reference means.

5. In a control for a servo system operable to position a member in a reference plane, servo means connected to drive said member, means including a reference means movable about an axis tiltable relative to said reference plane and operable to provide a rate reference for controlling the rate of operation of said servo means, means for establishing desired rates of movement of said reference means, movable means for effecting, when moved, an operation of said rate-establishing means, and means for progressively limiting the operation of said rate-establishing means whereby to limit the maximum rate established thereby as the angle of said axis relative to said reference plane decreases but without limiting the movement of said movable means controlling said rate-establishing means.

6. In a control for a servo system operable to position a member in a reference plane, servo means connected to drive said member, means including a reference means movable about an axis tiltable relative to said reference plane and operable to provide a rate reference for controlling the rate of operation of said servo means, means for establishing a rate of movement of said reference means, movable means for controlling said rate-establishing means, transmission means for imparting movement from said movable means to said rate-establishing means, said transmission means including means for progressively limiting the maximum degree of movement transmitted to said rate-establishing means as the angle of said axis to said reference plane decreases.

7. In a control for a servo system operable to position a member in a reference plane, servo means connected to drive said member, means including a gyro having one of its supporting axes tiltable relative to said reference plane for controlling the rate of operation of said servo means, torque producing means for effecting precession of said gyro about said supporting axis, movable means for controlling the operation of said torque-producing means, transmission means for imparting movement from said movable means to said torque-producing means, and means for effecting a limit, variable in magnitude as a function of the acute angle between the plane of precession of said gyro and said reference plane, on the movement imparted to said torque-producing means.

8. In a control for a servo system operable to position a member in a reference plane, servo means connected to drive said member, means including a reference means movable about an axis tiltable relative to said reference plane and operable to provide a rate reference for controlling the rate of operation of said servo means, means for establishing a rate of movement of said reference means, movable means for controlling said rate-establishing means, transmission means for imparting movement from said movable means to said rate-establishing means and including driving and driven members, means for coupling said members together in predetermined relationship but allowing relative movement thereof when motion of said driven member is retarded, and means for retarding the motion of said driven member to greater degrees as the angle between the plane of movement of said reference means and said reference plane increases.

9. In a servo system control for stabilized gun turrets comprising azimuth servo means for moving the turret in azimuth and elevation servo means for moving the guns in elevation, means for controlling the direction and rate of operation of said azimuth and elevation servo means including reference means for establishing azimuthal and elevation rate references for controlling respectively the rate of operation of said servo means, said reference means being angularly movable in elevation with said guns and the azimuthal rate reference being established in the slant plane of said guns, means for progressively lowering the value of the maximum rate establishable by said reference means in control of said azimuth servo means as the angle between the slant plane and the plane of azimuthal movement of said turret increases, and means for automatically limiting the displacement range through which said elevation servo means may move said guns.

10. In a servo system control for stabilized gun turrets comprising azimuth servo means for moving the turret in azimuth and elevation servo means for moving the guns in elevation, means for controlling the direction and rate of operation of said azimuth and elevation servo means including reference means for establishing azimuthal and elevation rate references for controlling respectively the rate of operation of said servo means, said reference means being angularly movable in elevation with said guns and the azimuthal rate reference being established in the slant plane of said guns, means for progressively lowering the value of the maximum rate establishable by said reference means in control of said azimuth servo means as the angle between the slant plane and the plane of azimuthal movement of said turret increases, means for providing a relatively fixed limit on angular displacement of said guns by said elevation servo means in elevation and in one direction relative to the plane of azimuthal movement of said turret, and means for providing a variable limit variable with azimuthal movement of said turret for elevation movements of said guns in the opposite direction relative to said plane of azimuthal movement of said turret.

11. In a control for a servo system operable to position a member in a reference plane, means including reference means movable about an axis tiltable relative to said reference plane and operable to provide a rate reference for controlling the rate of operation of said servo means, means for establishing a rate of movement of said reference means, movable means for controlling said last mentioned means, and a motion transmission system operatively connected with said rate-establishing means and said movable means, said system comprising first and second relatively movable elements cooperatively arranged one to limit the magnitude of movement of the other to varying degrees, one of said elements being operatively connected to said transmission and the other being provided with means for moving the same in timed relation with tilting movement of the axis of said reference means and one of said elements having a linear movement and the other a movement of rotation.

12. In a servo system control for stablized gun turrets comprising azimuth servo means for moving the turret in azimuth and elevation servo means for moving the guns in elevation, a control device responsive to a signal for controlling said elevation servo, a signal generator connected with said control device, a gyroscope for actuating said signal generator, a manually operable control for controlling the direction and rate of precession of said gyro, and means connected with said control device and operable independently of said signal generator for automatically terminating an operation of said elevation servo when the guns have been moved thereby through a relatively fixed displacement angle in elevation and in one direction relative to the plane of azimuthal movement of said turret.

13. In a servo system control for stablized gun turrets comprising azimuth servo means for moving the turret in azimuth and elevation servo means for moving the guns in elevation, a first means for controlling the direction and rate of operation of said azimuth and elevation servo means, and a second means for automatically terminating the operations of said elevation servo means, said second means including cooperable elements so constructed and arranged as to stop said elevation servo when the guns attain a predetermined displacement angle in elevation in one direction relative to the azimuthal plane of movement of said turret and means driven by said azimuth servo and cooperable with said elements for limiting the maximum gun displacement operation of said elevation servo to various values dependent upon the azimuthal position of said turret and for movement of said guns in the opposite direction relative to said plane.

14. In a servo system control for stabilized gun turrets comprising azimuth servo means for moving the turret in azimuth and elevation servo means for moving the guns in elevation, a control device responsive to a signal for controlling said elevation servo, a signal generator connected with said control device, actuating means for said signal generator, and means connected with said control device for automatically terminating an operation of said elevation servo when the guns have been moved thereby through a relatively fixed displacement angle in elevation and in one direction relative to the plane of azimuthal movement of said turret.

15. In a servo system control for stablized gun turrets comprising azimuth servo means for moving the turret in azimuth and elevation servo means for moving the guns in elevation, an electrically operated control device responsive to a signal voltage for controlling said elevation servo, a signal voltage generator connected with said control device, means for controlling said generator, means mechanically connected with said control device for automatically terminating an operation of said elevation servo, means movable with elevation movements of said gun for driving said last mentioned means, and means movable with azimuthal movements of said turret for further controlling said elevation servo-terminating means whereby to vary the magnitude of the elevation angle through which said guns may travel with changes in position of said turret in azimuth.

16. In a control system for stabilized gun turrets comprising azimuth servo means for moving the turret in azimuth and elevation servo means for moving the guns in elevation, torque motors each including an armature and field coils, said armatures being connected to control the operation of said servo means, respectively, means for controlling said torque motors including reference means for establishing azimuthal and elevation rate references, electrical pick-offs associated with said reference means and connected respectively with said torque motor field coils whereby to control said azimuth and elevation servo means in accordance with established reference rates, manual means for controlling said reference means, and means for mechanically connecting said manual means directly with the armature of said torque motors whereby the control of said azimuth and elevation servo means may be directly controlled from said manual means.

17. A system of the character recited in claim 16 in which the reference means of the torque motor controlling means is a gyroscope and the manually operable means includes means for applying precessing torques to said gyroscope.

18. In a control for a servo system operable to position a member in a reference plane, means including reference means movable about an axis tiltable relative to said reference plane and operable to provide a rate reference for controlling the rate of operation of said servo means, means for establishing a rate of movement of said reference means, movable means for controlling said last mentioned means, and a motion transmission system operatively connected with said rate-establishing means and said movable means, said system including a driving and driven member, respectively connected to said movable means and said rate-establishing means, a resilient coupling connecting said members, variable means for variably limiting the movement of said driven member, and means for varying the limiting value of said variable means in accordance with tilting movements of the axis of said reference.

19. In a control system for stabilized gun turrets, an azimuth servo for moving the turret in azimuth and an elevation servo for moving the guns in elevation, signal-responsive control means for each of said servos, a gyroscope and signal-producing means operated thereby for supplying signals to said control means, manually operable means movable in mutually perpendicular directions, torque-exerting means associated with said gyroscope, a motion transmitting system connected with said manual means and torque-exerting means, variable means included in said system for variably limiting the displacement transmitted to said torque-exerting means, and means operated by said elevation servo for actuating said variable means whereby said variable means will modify the control of said azimuth servo.

20. In a control for a servo system operable to position a member in a reference plane, servo means connected to drive said member, means including a reference means movable about an axis tiltable relative to said reference plane and operable to provide a rate reference for controlling the rate of operation of said servo means, means for establishing a rate of movement of said reference means, and means for modifying the control of said last mentioned means over said reference means substantially as a cosine function of the angle between said axis of the reference means and said reference plane.

21. In a control for a servo system operable to position a member in a reference plane, servo means connected to drive said member, means including a reference means movable about an axis tiltable relative to said reference plane and operable to provide a rate reference for controlling the rate of operation of said servo means, means for establishing a rate of movement of said reference means, movable means for controlling said rate-establishing means, transmission means for imparting movement from said movable means to said rate-establishing means, and means for providing a ratio between the transmission means input and output substantially proportional to the cosine of the angle between said axis of the reference means and said reference plane.

22. In a system of the character described, the combination with a member adapted to be positioned about first and second reference axes, a first servo motor means for driving said member about the first reference axis lying normal to a plane in which the rate of movement thereof is accurately measurable, a second servo motor means for driving said member about the second reference axis lying in said plane, means for establishing a rate reference about said first axis, means for controlling said first servo and its rate in accordance with said rate reference, variable means for variably limiting the maximum rate establishable by said rate-establishing means, and means operatively connected with said second servo for controlling said variable means.

23. In a control system of the character described, the combination with a member adapted to be positioned about first and second reference axes, a first servo means for driving said member about the first reference axis lying normal to a plane in which the rate of movement thereof is accurately measurable, a second servo means for driving said member about the second reference axis lying in said plane, means including a reference means movable about a pair of axes corresponding to the axes of movement of said member and operable to provide a rate reference for controlling the rate of operation of said servo means, means for establishing a rate of movement of said reference means, movable means for controlling said rate-establishing means, transmission means for imparting movement from said movable means to said rate-establishing means and including variable means for variably limiting the motion imparted to said rate-establishing means, and means for operatively connecting said variable means with said second servomotor, whereby the maximum rate reference which said rate-establishing means can provide to control said first servo is dependent upon the position of said member about said second axis.

24. In a control system of the character described, a positionable object, a servo mechanism for positioning said object, a torque motor having field coils and an armature, said armature being connected to control said servo mechanism, a manual controller, a signal voltage generator operated by said controller, the output of said signal generator being connected in controlling relation to the field coils of said torque motor, and means for mechanically connecting said manual controller to the armature of said torque motor whereby movements of said controller may be transmitted directly to the torque motor armature to thereby directly control said servo mechanism.

References Cited in the file of this patent

UNITED STATES PATENTS

| Number | Name | Date |
|---|---|---|
| 1,296,303 | Manly | Mar. 4, 1919 |
| 1,387,678 | Anderson | Aug. 16, 1921 |
| 1,394,520 | Akemann | Oct. 25, 1921 |
| 1,559,566 | Farrell et al. | Nov. 3, 1925 |
| 1,612,118 | Hewlett et al. | Dec. 28, 1926 |
| 1,747,349 | Crain | Feb. 18, 1930 |
| 1,825,994 | Cooke | Oct. 6, 1931 |
| 2,040,014 | Moseley | May 5, 1936 |
| 2,088,654 | Hull | Aug. 3, 1937 |
| 2,160,779 | Granat | May 30, 1939 |
| 2,189,823 | Vickers et al. | Feb. 13, 1940 |
| 2,226,288 | Pieplow | Dec. 24, 1940 |
| 2,286,561 | Meredith | June 16, 1942 |

FOREIGN PATENTS

| 616,248 | Germany | Aug. 1, 1935 |